United States Patent
Menzel et al.

(10) Patent No.: US 10,776,195 B2
(45) Date of Patent: Sep. 15, 2020

(54) APPARATUS FOR PROTECTING SIGNALS

(71) Applicants: Continental Teves AG & Co. oHG, Frankfurt (DE); Continental Automotive Systems, Inc., Auburn Hills, MI (US)

(72) Inventors: Marc Menzel, Weimar (DE); Andrew Kirby, Palatine, IL (US); Robert Faust D'Avello, Lake Zurich, IL (US)

(73) Assignees: Continental Teves AG & Co. oHG (DE); Continental Automotive Systems, Inc., Auburn Hills, MI (US)

( * ) Notice: Subject to any disclaimer, the term of this patent is extended or adjusted under 35 U.S.C. 154(b) by 176 days.

(21) Appl. No.: 16/107,057

(22) Filed: Aug. 21, 2018

(65) Prior Publication Data
US 2020/0065172 A1    Feb. 27, 2020

(51) Int. Cl.
*G06F 11/07* (2006.01)
*B60R 16/023* (2006.01)
(Continued)

(52) U.S. Cl.
CPC ........ *G06F 11/079* (2013.01); *B60R 16/0231* (2013.01); *B60T 7/12* (2013.01);
(Continued)

(58) Field of Classification Search
USPC ............................................................ 701/1
See application file for complete search history.

(56) References Cited

U.S. PATENT DOCUMENTS

| 2002/0194551 A1* | 12/2002 | Mueller | F02D 41/2493 |
| | | | 714/48 |
| 2005/0143879 A1* | 6/2005 | Yasuda | G05B 23/0221 |
| | | | 701/22 |

(Continued)

FOREIGN PATENT DOCUMENTS

WO    2017080556 A1    5/2017

OTHER PUBLICATIONS

Lu, D., et al., "Methods for certification of GNSS-based safe vehicle localisation in driving assistance systems," Oct. 19, 2015, pp. 226-231, XP032889581, International Conference on Connected Vehicles and Expo (ICCVE), IEEE.
(Continued)

*Primary Examiner* — Tyler D Paige
(74) *Attorney, Agent, or Firm* — RatnerPrestia

(57) ABSTRACT

An apparatus for protecting signals, including a first electronic computing device, and a second electronic computing device, wherein the second electronic computing device has a checking device, wherein the first and second electronic computing devices are designed to receive one or more different signals from one another and/or to emit them to one another, wherein the checking device is designed to check signals received from the second electronic computing device for formal correctness and/or to check the plausibility of said signals and to transmit the signals to the first electronic computing device and/or to a bus for transmitting data on the basis of the plausibility check and/or the check for formal correctness, wherein the second electronic computing device is configured according to a higher safety integrity level than the first electronic computing device. A corresponding method and to the use of the apparatus in a vehicle is also disclosed.

20 Claims, 3 Drawing Sheets

(51) Int. Cl.
  *B60T 7/12* (2006.01)
  *G01S 19/07* (2010.01)
  *G01S 19/47* (2010.01)

(52) U.S. Cl.
  CPC .............. *G01S 19/07* (2013.01); *G01S 19/47* (2013.01); *G06F 11/0739* (2013.01); *G06F 11/0751* (2013.01)

(56) References Cited

U.S. PATENT DOCUMENTS

| | | | |
|---|---|---|---|
| 2008/0130762 A1* | 6/2008 | Wiedemann | H04B 14/026 375/257 |
| 2012/0053888 A1 | 3/2012 | Stählin et al. | |
| 2013/0184990 A1* | 7/2013 | Stahlin | G01C 21/00 701/469 |
| 2015/0187209 A1* | 7/2015 | Brandt | G08C 19/00 340/12.22 |
| 2015/0210258 A1 | 7/2015 | Erdem et al. | |
| 2015/0330792 A1* | 11/2015 | Stahlin | G01C 21/16 701/479 |
| 2017/0066441 A1* | 3/2017 | Woodley | B60W 50/029 |
| 2017/0089722 A1* | 3/2017 | Steinhardt | G01C 21/165 |
| 2018/0063301 A1 | 3/2018 | Patel et al. | |
| 2018/0076833 A1* | 3/2018 | Akamine | H03M 13/6566 |
| 2018/0129626 A1* | 5/2018 | Bartley | G06F 13/4291 |
| 2018/0212792 A1* | 7/2018 | Brandt | H04L 65/1033 |
| 2018/0217269 A1* | 8/2018 | Zalewski | G01S 19/426 |
| 2018/0259651 A1 | 9/2018 | Antoni et al. | |
| 2018/0349235 A1* | 12/2018 | Freydel | G06F 11/187 |
| 2019/0384304 A1* | 12/2019 | Towal | G06K 9/00791 |
| 2019/0386858 A1* | 12/2019 | Wu | H04L 5/0048 |
| 2020/0017114 A1* | 1/2020 | Santoni | G05D 1/0088 |

OTHER PUBLICATIONS

International Search Report and Written Opinion for International Application No. PCT/EP2019/070814, dated Nov. 11, 2019, 12 pages.

* cited by examiner

APPARATUS FOR PROTECTING SIGNALS

FIELD OF THE INVENTION

The invention relates to an apparatus for protecting signals, to the use of the apparatus in a vehicle, and to a corresponding method.

BACKGROUND OF THE INVENTION

With technical progress, the number and range of functions and services, particularly in automobiles, are increasing continuously. In this case, the applications partly differ distinctly in their safety requirements. For example, a position which is not only intended to be made available to a person as information but is also intended to be made available to further applications in a vehicle, in particular safety-critical applications, entails increased safety requirements. In the case of emergency braking systems or driver assistance systems which have direct access to the vehicle operation as well, incorrect signals may have dramatic consequences. Functional safety development processes relevant to the automotive industry and corresponding work products are therefore standardized with the ISO 26262 standard. The respectively prescribed safety integrity level, or called automotive safety integrity level (ASIL for short) according to said standard, for ensuring a multiplicity of applications is usually associated with a high degree of complexity.

SUMMARY OF THE INVENTION

An aspect of the invention aims to provide an apparatus and a method which can be used to implement a particular safety integrity level with a low degree of complexity and in a cost-effective manner.

An aspect of the invention relates to an apparatus for protecting signals, comprising:
 a first electronic computing device, and
 a second electronic computing device, wherein the second electronic computing device has a checking device,
wherein the first and second electronic computing devices are designed to receive one or more different signals from one another and/or to emit them to one another,
wherein the checking device is designed to check signals received from the second electronic computing device for formal correctness and/or to check the plausibility of said signals and to transmit the signals to the first electronic computing device and/or to a bus for transmitting data, in particular a vehicle bus, on the basis of the plausibility check and/or the check for formal correctness,
wherein the second electronic computing device is configured according to a higher safety integrity level than the first electronic computing device.

The apparatus according to an aspect of the invention has the advantage that the checking device makes it possible to check signals or to check the plausibility of signals, and the complexity of a higher safety integrity level is associated only with the second electronic computing device in this case. In contrast, the first electronic computing device can be designed, for example, as substantially non-safety-relevant according to an ASIL QM (quality management) classification, with the result that no increased complexity or increased costs arise(s) here.

So that an electronic computing device efficiently reaches a particular safety integrity level, intelligent use of redundancy and diversity at the functional level and a sophisticated architecture having protective and diagnostic mechanisms can be strived for, for example. Faults of the same origin can be avoided in hardware and software using a slightly modified redundant design, for example.

The first and second electronic computing devices are each preferably formed as a separate microcontroller or processor or a region of a die or chip of a microcontroller or processor. In particular, different regions of the die or chip can be used to accordingly implement the possibly different safety integrity levels. Alternatively or additionally, said devices can also be provided on a plurality of dies or chips.

It is preferred that at least one signal, for the reception or emission of which the first electronic computing device is designed, is in the form of a signal from a vehicle application. The apparatus is preferably designed in such a manner that the first electronic computing device provides more than one vehicle application and the signals are in the form of signals from the respective applications. Synergy effects are therefore used with the apparatus and complexity and costs are saved.

According to one preferred embodiment, the checking device is designed to check signals received from the second electronic computing device for formal correctness by means of a time stamp and/or a signal counter and/or a check value, in particular in the form of a cyclic redundancy check. The time stamp is expediently checked by comparing it with a current time, in which case provision may be made for signals whose time stamp indicates that a predefined age has been exceeded to be rejected. Checking the signal counter makes it possible to ensure that the correct sequence of signals has not been jumbled up during signal transmission. The check value calculated according to a particular method makes it possible to check whether errors have occurred during transmission.

The checking device is preferably designed to check signals received from the second electronic computing device for plausibility on the basis of a stored signal history. For example, a history of position signals calculated on the basis of GNSS signals reveals a particular region within which the next position signal must lie, given the physical boundaries of a road vehicle for example, in order to be considered realistic.

The first electronic computing device is preferably designed to generate a signal to be emitted in the form of a position signal on the basis of a received GNSS signal and to transmit it to the second electronic computing device.

In this respect, reference is made to the applications US 2017/0089722 A1, US 2013/0184990 A1 and US 2018/0217269 A1, the contents of which are hereby incorporated by reference in this application.

The first electronic computing device is preferably designed to use, in addition to the GNSS signal, sensor signals from a vehicle, in particular sensor signals from wheel speed, radar, camera, steering angle and/or inertial sensors, to generate the position signal.

In this respect, it is advantageous if the first electronic computing device has a filter for generating the position signal from the GNSS signal and the sensor signals from the vehicle. This can enable a particularly precise position signal, for example by weighting the incoming information.

According to one preferred embodiment, the first electronic computing device has an e-call device for triggering an automatic emergency call, wherein the second electronic computing device is designed to receive an e-call signal from a bus for transmitting data, in particular a vehicle bus, to check it and/or to check its plausibility by means of the checking device and to transmit it to the e-call device. The triggering of an automatic emergency call can be initiated, for example, by means of a signal coming from an airbag or an accident detection system.

According to another preferred embodiment, the first electronic computing device has a slowdown device for triggering automatically initiated braking or deceleration of a vehicle, wherein the second electronic computing device is designed to receive a slowdown signal from the slowdown device, to check it and/or to check its plausibility by means of the checking device and to transmit it to a bus for transmitting data, in particular a vehicle bus. Such a slowdown device makes it possible to stop a stolen vehicle, for example, and to prevent the vehicle thief from escaping.

According to another preferred embodiment, the first electronic computing device has a remote start device for remotely starting a vehicle engine, wherein the second electronic computing device is designed to receive a remote start signal from the remote start device, to check it and/or to check its plausibility by means of the checking device and to transmit it to a bus for transmitting data, in particular a vehicle bus. The remote start device makes it possible to remotely start a vehicle and to activate an air-conditioning system in good time, for example.

It is preferred that signals are received and/or emitted between the first and second electronic computing devices via an electronic interface, wherein the interface is configured according to a higher safety integrity level than the first electronic computing device, in particular according to the safety integrity level of the second electronic computing device.

The first electronic computing device is preferably designed according to the safety integrity level ASIL QM and the second electronic computing device is preferably designed according to one of the safety integrity levels ASIL A, ASIL B, ASIL C and ASIL D, particularly preferably ASIL B.

The apparatus according to one of the exemplary embodiments mentioned above is preferably used in a vehicle, in particular a road vehicle.

According to another aspect of the invention, a method for protecting signals by means of an apparatus according to one of the exemplary embodiments mentioned above has the steps of:
  receiving a signal from a bus for transmitting data or from the first electronic computing device by means of the second electronic computing device,
  checking the plausibility of the signal received from the second electronic computing device and/or checking the signal received from the second electronic computing device for formal correctness by means of the checking device, in particular with the aid of a time stamp and/or a signal counter and/or a check value,
  transmitting the signal to the first electronic computing device and/or transmitting the signal to a bus for transmitting data, in particular a vehicle bus, on the basis of the result of the plausibility check and/or the result of the check for formal correctness.

The method is preferably developed by the steps of:
  receiving a GNSS signal by means of a GNSS receiver (4),
  generating the signal in the form of a position signal by means of the first electronic computing device on the basis of the received GNSS signal,
  transmitting the signal in the form of the position signal to the second electronic computing device.

The method preferably also comprises the step of:
  generating the position signal by means of the first electronic computing device using sensor signals from a vehicle, in particular sensor signals from wheel speed, radar, camera, steering angle and/or inertial sensors, preferably by filtering the GNSS signal with the sensor signals from the vehicle.

According to another aspect of the invention, the apparatus according to the invention is set up to carry out a method according to at least one of the preceding embodiments.

In one development of the specified vehicle-to-X communication apparatus, the specified apparatus has at least one memory and a processor. In this case, the specified method is stored in the memory in the form of a computer program, and the processor is provided for carrying out the method when the computer program is loaded into the processor from the memory.

According to a further aspect of the invention, a computer program comprises program code means in order to perform all the steps of one of the specified methods when the computer program is executed on a computer or one of the specified apparatuses.

According to a further aspect of the invention, a computer program product contains a program code that is stored on a computer-readable data storage medium and that, when executed on a data processing device, performs one of the specified methods.

BRIEF DESCRIPTION OF THE DRAWINGS

Further preferred embodiments also emerge from the following description of exemplary embodiments on the basis of figures.

In a schematic representation.

DETAILED DESCRIPTION OF THE PREFERRED EMBODIMENTS

Figure 1:
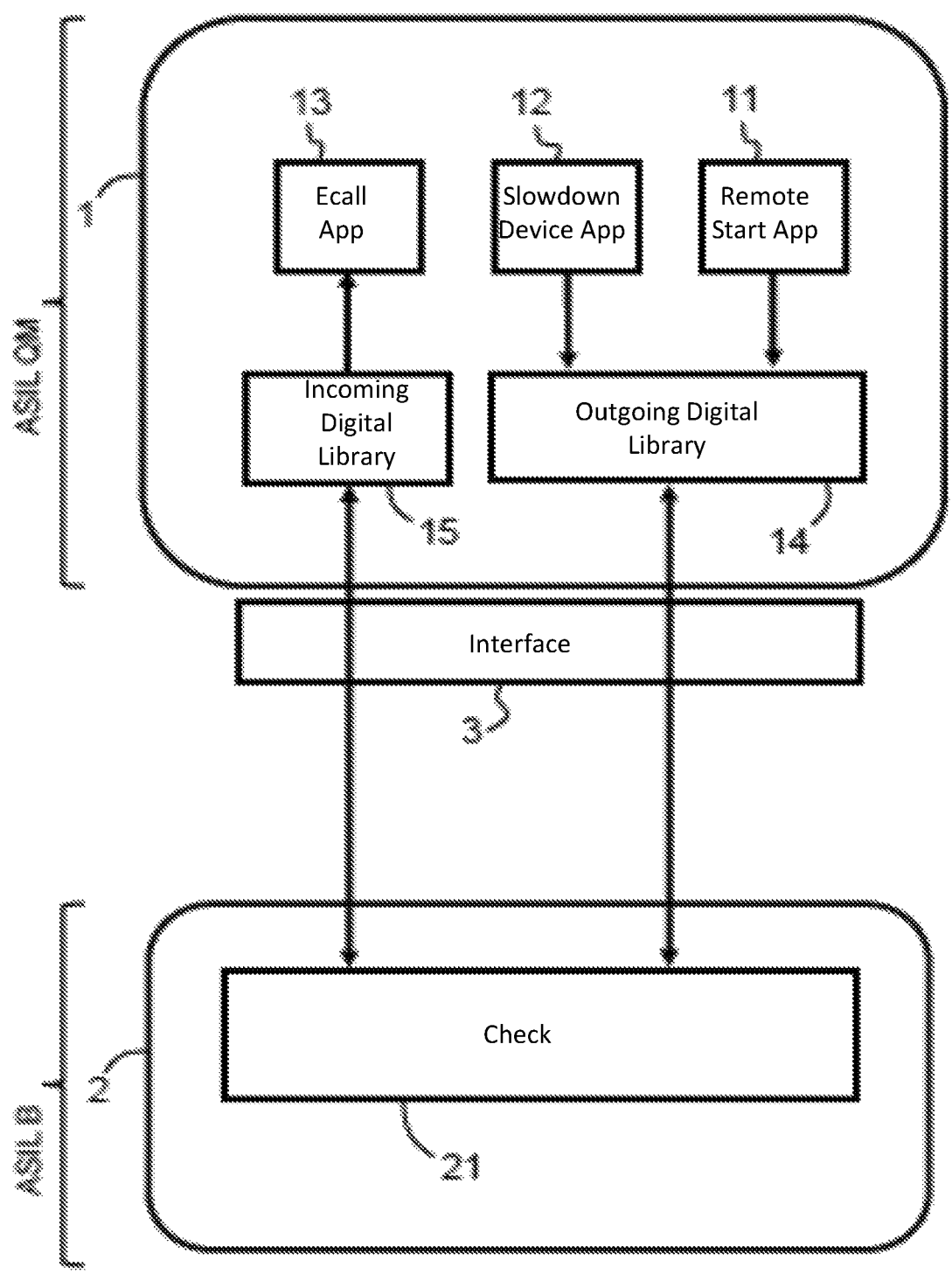
FIG. 1 shows an exemplary embodiment of an apparatus according to an aspect of the invention.

FIG. 1 shows an exemplary embodiment of an apparatus according to an aspect of the invention. The apparatus comprises a first electronic computing device 1 and a second electronic computing device 2 which are designed to receive one or more different signals from one another and/or to emit them to one another. In this case, the second electronic computing device 2 with ASIL B is configured according to a higher safety integrity level than the first electronic computing device 1 with ASIL QM. The corresponding ASIL classification is respectively indicated with a bracket symbol in FIG. 1 and FIG. 2. A plurality of vehicle applications are implemented in the first electronic computing device 1, which is configured to execute a Linux operating system for example, the plausibility of the outgoing and incoming signals of said vehicle applications being checked by a checking device 21 in the second electronic computing device 2 and being checked for formal correctness. The signals are represented by arrows in the figures.

A first vehicle application is in the form of a remote start device 11. Its output signal is transferred to a digital library 14 for outgoing signals which is implemented on the first electronic computing device 1 classified with ASIL QM but is preferably designed according to the ASIL B standard.

The signal is transferred to the second electronic computing device 2 via an interface 3 designed according to the ASIL B standard.

There, the signal is checked for formal correctness in the checking device 21 by means of a time stamp, a signal counter and a CRC check value. The checking of the time stamp corresponds to a comparison with a current time, thus ensuring that no out-of-date signals are processed. Checking the signal counter makes it possible to ensure that the correct sequence of signals has not been jumbled up during signal transmission. The CRC check value can be used to check whether errors have occurred during transmission or whether information has been lost. If formal correctness of the signal has been determined, an output to a bus 5 of the vehicle for transmitting data is then effected.

The first electronic computing device 1 also contains a further vehicle application which is in the form of a slow-down device 12 and the signals from which are processed in a similar manner to those from the remote start device 11.

The signals take the opposite path in the case of a further vehicle application in the form of an e-call device 13. The second electronic computing device 2 receives the corresponding signal from the bus 5 of the vehicle. After the formal correctness has been checked in the checking device 21 by means of the time stamp, signal counter and the CRC check value, the output to the e-call device 13 is effected via the interface 3 and a digital library 15 for incoming signals.

Figure 2:
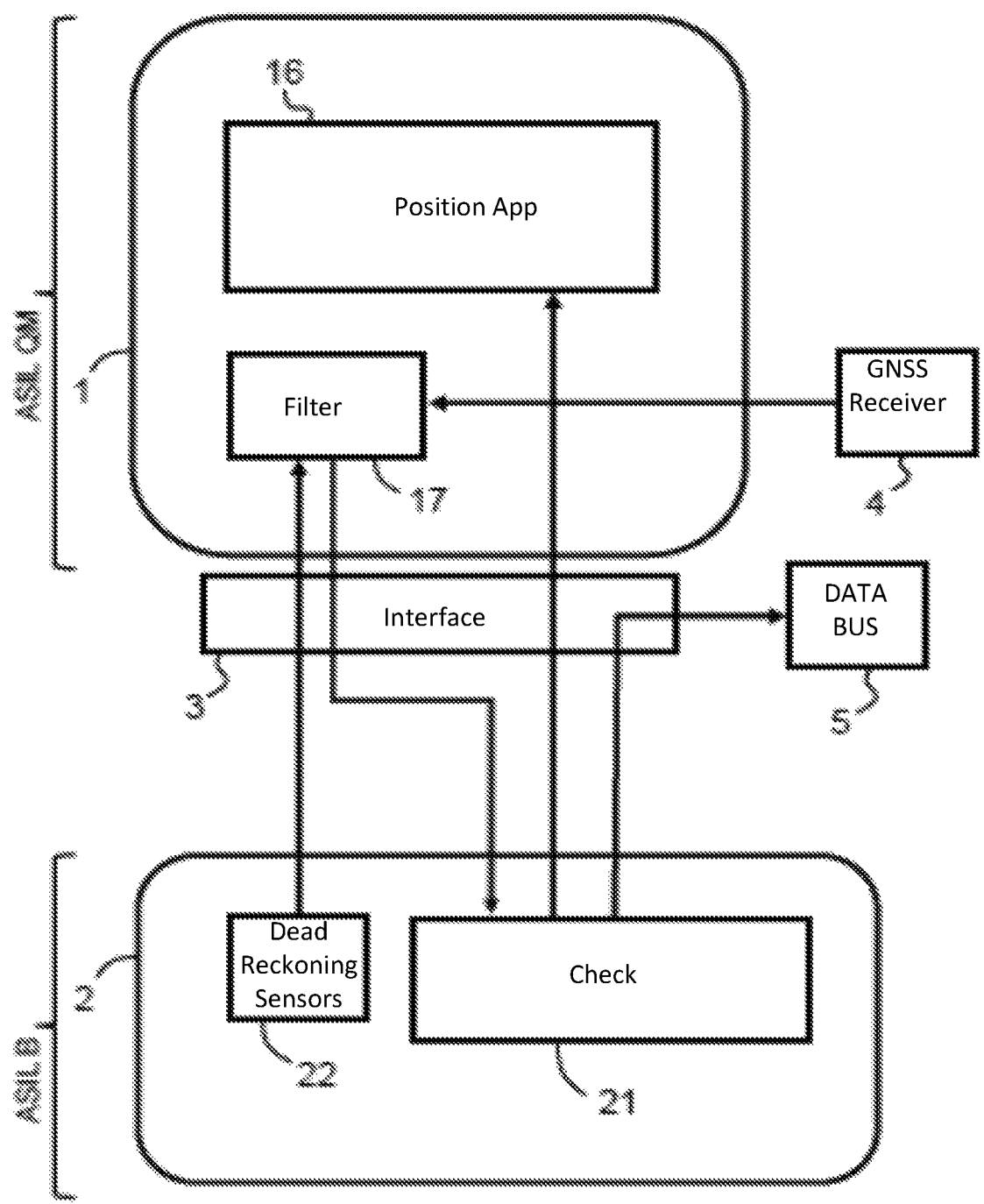
FIG. 2 shows another exemplary embodiment or an additional aspect of the exemplary embodiment from FIG. 1.

With the position application 16, FIG. 2 illustrates a further vehicle application of the first electronic computing device 1. It goes without saying that the exemplary embodiment shown in FIG. 2 can be implemented in an apparatus according to an aspect of the invention and with the same hardware according to an embodiment together with the features explained in FIG. 1.

The vehicle application is one or more vehicle applications which require a position signal as an input variable. For this purpose, a GNSS signal from a satellite navigation system is first of all received using a corresponding GNSS receiver 4 and is transferred to the first electronic computing device 1. There, a position is calculated (dead reckoning) with the aid of further sensor signals 22 by means of a filter 17, which position is more precise and more reliable with the aid of the sensor signals 22 than with the GNSS signal alone. The position signal obtained in this manner is transferred to the second electronic computing device 2 and is checked for formal correctness in the checking device 21 by means of a time stamp, a signal counter and a CRC check value. In addition, the plausibility of the position signal is checked on the basis of the stored signal history.

The position signal whose plausibility has been checked and which has been checked for formal correctness by means of a device designed according to ASIL B is then transferred to the corresponding position application 16 and additionally to a bus 5 of the vehicle for transmitting data.

Figure 3:
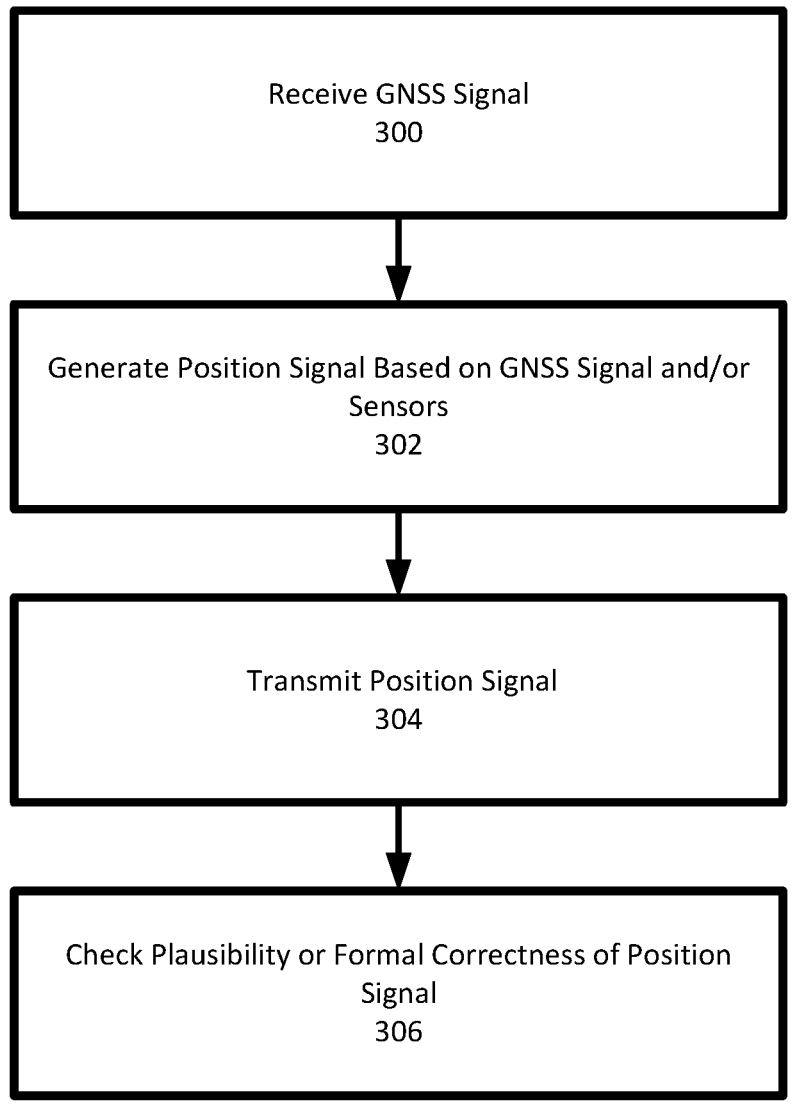
FIG. 3 shows a flowchart of the operation of the computing devices according to an aspect of the embodiment.

FIG. 3 shows a flowchart of the operation of the computing devices. In step 300, a signal (e.g. GNSS signal) is received. In step 302 a position signal is generated based on the received signal and/or based on sensor signals. In step 304, the position signal is transmitted, and in step 306, a plausibility check or a check for formal correctness of the position is performed.

If it turns out in the course of the proceedings that a feature or a group of features is not absolutely necessary, then the applicant aspires right now to a wording for at least one independent claim that no longer has the feature or the group of features. This may be, by way of example, a subcombination of a claim present on the filing date or may be a subcombination of a claim present on the filing date that is limited by further features. Claims or combinations of features of this kind requiring rewording can be understood to be covered by the disclosure of this application as well.

It should further be pointed out that configurations, features and variants of aspects of the invention that are described in the various embodiments or exemplary embodiments and/or shown in the figures can be combined with one another in any way. Single or multiple features can be interchanged with one another in any way. Combinations of features arising therefrom can be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to an aspect of the invention. They can therefore also be individually included in claims for the purpose of distinction from the prior art.

The invention claimed is:

1. An vehicle apparatus for protecting signals of a vehicle application, comprising:
   a first electronic computing device in the vehicle, the first electronic computing device including a first processor configured to execute the vehicle application according to a first safety integrity level; and
   a second electronic computing device in the vehicle, the second electronic computing device including a second processor configured as a checking device performing signal checking according to a second safety integrity level that is higher than the first safety integrity level,
   wherein the first electronic computing device and the second electronic computing device are designed to receive one or more different signals from one another and/or to emit the one or more different signals to one another, and
   wherein the checking device is configured to:
      perform the signal checking of the one or more signals received by the second electronic computing from the first electronic computing device for at least one of formal correctness, or plausibility, and
      transmit a notification to the first electronic computing device indicating that the one or more signals are checked, the first electronic computing device using the one or more signals in the vehicle application, or transmit the checked signals to a vehicle data bus.

2. The apparatus as claimed in claim 1, wherein at least one signal, for the reception or emission of which the first electronic computing device is designed, is in the form of a signal from a vehicle application.

3. The apparatus as claimed in claim 2, wherein the checking device is designed to check signals received from the second electronic computing device for formal correctness by at least one of a time stamp, a signal counter, or a cyclic redundancy check.

4. The apparatus as claimed in claim 1, wherein the checking device is designed to check signals received from the second electronic computing device for formal correctness by at least one of a time stamp, a signal counter, or a check value.

5. The apparatus as claimed in claim 1, wherein the checking device is designed to check signals received from the second electronic computing device for plausibility on the basis of a stored signal history.

6. The apparatus as claimed in claim 1, wherein the first electronic computing device is designed to generate a signal to be emitted in the form of a position signal on the basis of a received GNSS signal and to transmit it to the second electronic computing device.

7. The apparatus as claimed in claim 6, wherein the first electronic computing device is designed to use, in addition to the GNSS signal, sensor signals from a vehicle to generate the position signal.

8. The apparatus as claimed in claim 7, wherein the first electronic computing device has a filter for generating the position signal from the GNSS signal and the sensor signals from the vehicle.

9. The apparatus as claimed in claim 6, wherein the first electronic computing device is designed to use, in addition to the GNSS signal, sensor signals from a vehicle selected from the group consisting a wheel speed sensor, a radar, a camera, a steering angle sensor and an inertial sensor, to generate the position signal.

10. The apparatus as claimed in claim 1, wherein the first electronic computing device has a slowdown device for triggering automatically initiated braking or deceleration of a vehicle, wherein the second electronic computing device is designed to receive a slowdown signal from the slowdown device, to check it and/or to check its plausibility by the checking device and to transmit it to a bus for transmitting data.

11. The apparatus as claimed in claim 1, wherein signals are received and/or emitted between the first and second electronic computing devices via an electronic interface, wherein the interface is configured according to a higher safety integrity level than the first electronic computing device.

12. The apparatus as claimed in claim 1, wherein the first electronic computing device is designed according to the safety integrity level ASIL QM and the second electronic computing device is designed according to one of the safety integrity levels ASIL A, ASIL B, ASIL C and ASIL D, preferably ASIL B.

13. The use of the apparatus as claimed in claim 1 in a vehicle.

14. A method for protecting signals of a vehicle application by an apparatus as claimed in claim 1, the method comprising:
checking, by the checking device, the plausibility of the signal received by the second electronic computing device and/or checking the signal received by the second electronic computing device for formal correctness with the aid of at least one of a time stamp, a signal counter or a check value.

15. The method as claimed in claim 14, further comprising:
receiving a GNSS signal by a GNSS receiver,
generating the signal in the form of a position signal by the first electronic computing device on the basis of the received GNSS signal, and
transmitting the signal in the form of the position signal to the second electronic computing device.

16. The method as claimed in claim 15, further comprising:
generating the position signal by the first electronic computing device using sensor signals from a vehicle.

17. The method as claimed in claim 15, further comprising:

generating the position signal by the first electronic computing device using sensor signals from a vehicle, selected from the group consisting of a wheel speed sensor, radar, a camera, a steering angle sensor and inertial sensors, by filtering the GNSS signal with the sensor signals from the vehicle.

18. The apparatus as claimed in claim 1, wherein signals are received and/or emitted between the first and second electronic computing devices via an electronic interface, wherein the interface is configured according to the safety integrity level of the second electronic computing device.

19. A vehicle apparatus for protecting signals of a vehicle application, comprising:
a first electronic computing device in the vehicle, the first electronic computing device including a first processor configured to execute the vehicle application according to a first safety integrity level; and
a second electronic computing device in the vehicle, the second electronic computing device including a second processor configured as a checking device performing signal checking according to a second safety integrity level that is higher than the first safety integrity level,
wherein the first electronic computing device and the second electronic computing device are designed to receive one or more different signals from one another and/or to emit the one or more different signals to one another,
wherein the checking device is configured to:
perform the signal checking of the one or more signals received by the second electronic computing device for at least one of formal correctness, or plausibility, and
transmit the one or more signals to the first electronic computing device or to a vehicle data bus on the basis of the check for at least one of formal correctness or plausibility, and
wherein the first electronic computing device has an e-call device for triggering an automatic emergency call, wherein the second electronic computing device is designed to receive an e-call signal from a bus for transmitting data, to check it and/or to check its plausibility by the checking device and to transmit it to the e-call device.

20. A vehicle apparatus for protecting signals of a vehicle application, comprising:
a first electronic computing device in the vehicle, the first electronic computing device including a first processor configured to execute the vehicle application according to a first safety integrity level; and
a second electronic computing device in the vehicle, the second electronic computing device including a second processor configured as a checking device performing signal checking according to a second safety integrity level that is higher than the first safety integrity level,
wherein the first electronic computing device and the second electronic computing device are designed to receive one or more different signals from one another and/or to emit the one or more different signals to one another,
wherein the checking device is configured to:
perform the signal checking of the one or more signals received by the second electronic computing device for at least one of formal correctness, or plausibility, and transmit the one or more signals to the first electronic computing device or to a vehicle data bus on the basis of the check for at least one of formal correctness or plausibility, and wherein the first electronic computing device has a remote start device for remotely starting a vehicle engine, wherein the second electronic computing device is designed to receive a remote start signal from the remote start device, to check it and/or to check its plausibility by the checking device and to transmit it to a bus for transmitting data.

\* \* \* \* \*